United States Patent
Kim

(10) Patent No.: US 8,527,358 B2
(45) Date of Patent: Sep. 3, 2013

(54) METHOD AND SYSTEM FOR SUPPORTING PURCHASE OF GAME ITEM

(75) Inventor: Chang Woo Kim, Seoul (KR)

(73) Assignee: NHN Corporation, Seongnam-si (KR)

( * ) Notice: Subject to any disclaimer, the term of this patent is extended or adjusted under 35 U.S.C. 154(b) by 420 days.

(21) Appl. No.: 12/646,332

(22) Filed: Dec. 23, 2009

(65) Prior Publication Data

US 2010/0167814 A1 Jul. 1, 2010

(30) Foreign Application Priority Data

Dec. 31, 2008 (KR) .................. 10-2008-0138685

(51) Int. Cl.
*G06Q 30/00* (2012.01)

(52) U.S. Cl.
USPC .................. 705/26.1; 463/1; 463/25; 463/29; 463/42

(58) Field of Classification Search
USPC .................. 705/26.1; 463/1, 25, 29, 42
See application file for complete search history.

(56) References Cited

U.S. PATENT DOCUMENTS

2007/0087822 A1* 4/2007 Van Luchene .................. 463/25
2008/0214311 A1* 9/2008 Saito et al. ...................... 463/42

FOREIGN PATENT DOCUMENTS

| JP | 1997-044576 | 2/1997 |
| JP | 2001-340656 | 12/2001 |
| JP | 2005-115435 | 4/2005 |
| JP | 2005-115626 | 4/2005 |
| JP | 2007-267859 | 10/2007 |
| KR | 10-2002-0026490 | 4/2002 |
| KR | 10-2008-0044395 | 5/2008 |

\* cited by examiner

*Primary Examiner* — Yogesh C Garg
(74) *Attorney, Agent, or Firm* — H.C. Park & Associates, PLC

(57) ABSTRACT

Provided is a method of supporting a purchase of a game item that may support a portion of a price of the game item so that a user may easily obtain the game item. The game item purchase supporting method may include questioning a user about whether to transmit a purchase support request for the game item, generating purchase support information associated with the user to provide the user with the game item when the purchase support request of the game item is received from the user, and storing the purchase support information to match identification information of the user.

21 Claims, 4 Drawing Sheets

METHOD AND SYSTEM FOR SUPPORTING PURCHASE OF GAME ITEM

CROSS REFERENCE TO RELATED APPLICATION

This application claims priority from and the benefit of Korean Patent Application No. 10-2008-0138685, filed on Dec. 31, 2008, which is hereby incorporated by reference for all purposes as if fully set forth herein.

BACKGROUND OF THE INVENTION

1. Field of the Invention

Exemplary embodiments of the present invention relate to a method and system for providing a game service, and more particularly, to a method and system for providing financial support in purchasing a game item.

2. Discussion of the Background

Generally, online or offline games provide users with various types of game items to enhance their interest in the games. In this instance, a game item may be provided to a user with or without charge. For example, the game item may be provided to the user without charge provided that the user completes a mission in a corresponding game according to a game scenario. The mission may include, for example, a monster hunt, a quest completion, a destruction of a particular object, opening or a creation of the particular object, and the like. Also, the game item may be provided to the user without charge at an event or the like that may occur in the game or outside the game.

The game item may be provided to the user with charge by exchanging the game item with game money corresponding to a price of the game item from game money obtained by the user.

However, in the case of providing the user with the game item without charge, the user may not be a skillful high-level player. In this case, the user may not easily complete a mission. Therefore, the user may not be able to obtain the game item or it may take some time to obtain the game item. In the case of providing the user with the game item at an event, the event may occur within a temporary and limited range.

In the case of providing the user with the game item with charge, the user who desires to purchase the game item may not have an amount of game money sufficient to cover a price of the game item. In this case, the user may not obtain the corresponding game item.

In the aforementioned game item obtainment method according to a conventional technique, among users who may not easily complete a mission according to a game scenario or among users that may have an insufficient amount of game money, many of them may be beginners. Accordingly, it may cause the users to feel weary of playing the corresponding game or to feel bored of an obtainment process for the game item, which may result in declining user interest and participation in the game.

SUMMARY OF THE INVENTION

Exemplary embodiments of the present invention provide a method and system for supporting a purchase of a game item that may partially support a price of a game item when a user desires to purchase the game item, so that the user may more easily obtain the game item.

Exemplary embodiments of the present invention also provide a method and system for supporting a purchase of a game item that may convert, to an amount, game money obtained by a user during a game progress and activity points of the user evaluated in a corresponding game, and thereby may enable the user to reimburse a purchase support amount.

Exemplary embodiments of the present invention also provide a method and system for supporting a purchase of a game item that may limit trading of game items obtained through a purchase support.

Additional features of the invention will be set forth in the description which follows, and in part will be apparent from the description, or may be learned by practice of the invention.

An exemplary embodiment of the present invention discloses a method that uses a processor to support a purchase of a game item, the method including receiving a purchase support request for the game item, the purchase support request being associated with a user, generating, using the processor, purchase support information associated with the user, providing the user with the game item in response to receipt of the purchase support request, and storing the purchase support information in association with identification information of the user.

An exemplary embodiment of the present invention also discloses a non-transitory computer-readable medium including an executable program which, when executed, performs the steps of receiving a purchase support request for the game item, the purchase support request being associated with a user, generating purchase support information associated with the user, providing the user with the game item in response to receipt of the purchase support request, and storing the purchase support information in association with identification information of the user.

An exemplary embodiment of the present invention also discloses a system for supporting a purchase of a game item, the system including a user interface module to receive a purchase request or a purchase support request for the game item, a purchase support decision module to determine whether it is possible to support a purchase of the game item with respect to the user, and to determine whether to support the purchase of the game item, in response to receipt of the purchase request or the purchase support request, a purchase support performing module to question, using the user interface module, the user about whether to transmit the purchase support request for the game item, in response to a determination that the purchase of the game item is supported, to generate purchase support information associated with the user in response to receipt of the purchase support request, and to store the purchase support information in association with identification information of the user, and a game item providing module to provide the user with the game item in response to a direction from the purchase support performing module.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Figure 1:
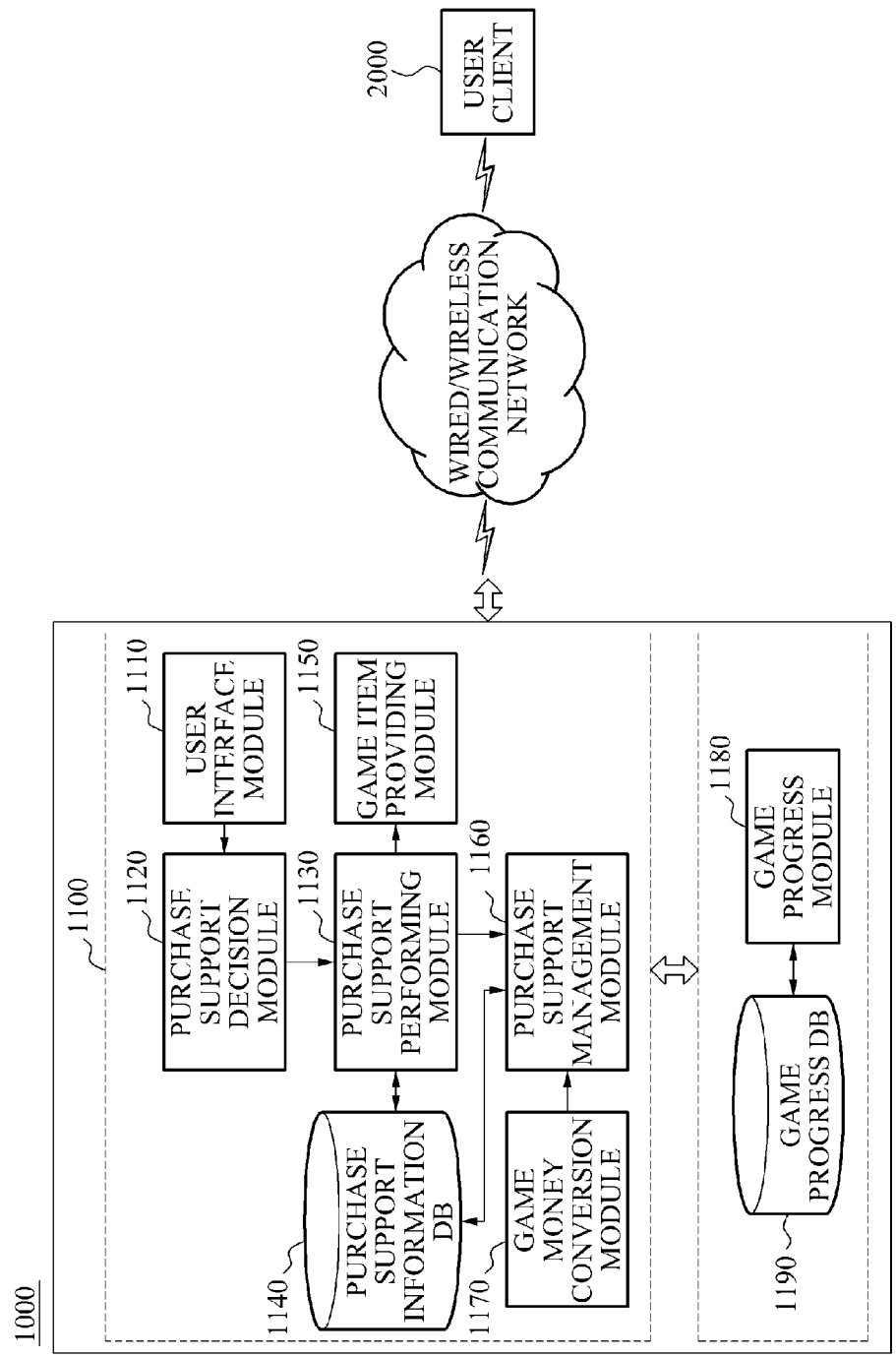
FIG. 1 is a block diagram illustrating a network configuration using a system for supporting a purchase of a game item according to an exemplary embodiment of the present invention.

The invention is described more fully hereinafter with reference to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

FIG. 1 is a block diagram illustrating a network configuration using a game item purchase supporting system 1000 for supporting a purchase of a game item according to an exemplary embodiment of the present invention.

Referring to FIG. 1, the game item purchase supporting system 1000 is connected to a user client 2000 using a wired/wireless communication network. When a purchase request for a corresponding game item is received from the user client 2000, the game item purchase supporting system 1000 may perform functions supporting the purchase of the requested game item. The game item purchase supporting system 1000 may be installed in a game server (not shown) providing the user client 2000 with a game service online, or it may interoperate with such a game server.

The user client 2000 may be a user communication terminal connected to the wired/wireless communication network. The user client 2000 may receive various types of game services and may include, for example, a desktop personal computer (PC), a notebook, a console, a cellular phone, a personal digital assistant (PDA), and a Mobile Broadcasting System (MBS) phone.

The user client 2000 may receive a personal program from the game server to execute the game program in a web browser (not shown), thereby enabling a user to play various types of games online.

Hereinafter, the user client 2000 will be referred to as a user for ease of description.

As shown in FIG. 1, the game item purchase supporting system 1000 may include a user interface module 1110, a purchase support decision module 1120, a purchase support performing module 1130, a purchase support information database 1140, a game item providing module 1150, and a purchase support management module 1160.

The user interface module 1110 enables a user playing a game to view game items and a purchase price of each of the game items. The user interface module 1110 may receive, from the user, a purchase request for the user's desired game item or a purchase support request for the game item, which will be described later.

When the purchase request is received via the user interface module 1110, the purchase support decision module 1120 may determine whether it is possible to support the purchase of the game item with respect to the user and thereby determine whether to support the purchase of the game item.

The purchase support decision module 1120 may determine whether the user currently is receiving a game item purchase support service. Only when the user is not currently receiving the game item purchase support service, the purchase support decision module 1120 may determine the purchase of the game item with respect to the user is supported.

Whether the user currently is receiving the game item purchase support service may be determined depending on whether purchase support information associated with the user is included in the purchase support information database 1140. When the purchase support information is included, it may be determined the user is receiving the game item purchase support service.

When an additional game item purchase support service is provided to a user currently receiving the game item purchase support service, the user may obtain game items without effort or cost, which may diminish the user's interest in or enjoyment of a corresponding game.

When it is determined that the user is currently receiving the game item purchase support service, that is, when purchase support information associated with the user exists, the purchase support decision module 1120 may generate a purchase support rejection message with respect to the game item, and transmit the purchase support rejection message to the user.

The purchase support decision module 1120 may verify a currently available amount of game money of the user requesting the purchase of the game item. When the available amount of game money of the user is less than the price of the game item, the purchase support decision module 1120 may determine it is possible to support the purchase of the game item with respect to the user. Accordingly, even a user not having a sufficient amount of game money for the price of the game item may obtain a desired game item through the purchase support of the game item.

Conversely, when the amount of game money of the user is greater than the price of the game item, the user may make a payment with the game money. Accordingly, the purchase support decision module 1120 may not need to support the purchase of the game item.

When the purchase support for the user is determined, the purchase support performing module 1130 may question, using the user interface module 1110, the user about whether to transmit the purchase support request for the game item. When the purchase support request for the game item is received from the user, the purchase support performing module 1130 enables the game item providing module 1150 to provide the user with the game item corresponding to a purchase support target. The purchase support performing module 1130 may generate purchase support information associated with the user and store, in the purchase support information database 1140, the purchase support information in association with identification information of the user.

The purchase support information may include a purchase support amount and a reimbursement ratio of the purchase support amount. The purchase support amount denotes an amount provided by the purchase support performing module 1130 to support the purchase of the requested game item. For example, when the price of the game item corresponding to the purchase support target is 1000 won and the amount of game money the user has is 500 won, the purchase support amount may be determined as 500 won corresponding to a difference between the price of the game item and the amount of game money of the user.

When the user having received the game item purchase support service obtains game money during a game progress or converts activity points of the user to game money in order to reimburse the purchase support amount, the reimbursement ratio of the purchase support amount denotes a ratio of an amount to be used for reimbursing the purchase support amount among the game money obtained by the user or the converted game money.

For example, when the reimbursement ratio of the purchase support money is determined as 10% and 500 won is obtained as or converted to game money, 10% of 500 won, that is, 50 won may be determined as the reimbursement amount.

It is described above that the purchase support information includes the reimbursement ratio of the purchase support amount. However, it is only an example. The purchase support information may include the reimbursement amount. For example, when the reimbursement amount is determined as 50 won and 500 won is obtained as or converted to game money, 50 won may be reimbursed.

Accordingly, the reimbursement ratio or the reimbursement amount is only an example and thus any information associated with a reimbursement scheme of the purchase support amount may be applicable.

As described above, the reimbursement scheme of the purchase support amount may be determined by the purchase support performing module 1130. Also, the user receiving the game item purchase support service may directly select the reimbursement scheme of the purchase support amount.

When the corresponding game item is provided to the user by the game item providing module 1150, the purchase support performing module 1130 may include, in a game progress database 1190, an identifier of the game item corresponding to the purchase support target to match an identifier of the user. The identification is used to prevent the game item obtained through the purchase support from being transferred or being presented to another user through a trade.

Accordingly, the purchase support performing module 1130 may continuously monitor whether the game item corresponding to the purchase support target is used as the game progresses. When the game item is used and a user identifier associated with the identifier of the game item changes, the purchase support performing module 1130 may determine the game item is traded and thereby suspend a use of the game item.

When the purchase support management module 1160 determines that an entire purchase support amount included in the purchase support information is reimbursed, the purchase support performing module 1130 may delete the purchase support information in the purchase support information database 1140.

The purchase support information generated by the purchase support performing module 1130 may be included in the purchase support information database 1140 to match the identifier of the user. The purchase support information database 1140 may additionally include information associated with reimbursement of the purchase support amount, for example, information associated with a reimbursed date, the reimbursement amount, and the like, in addition to the purchase support information.

According to control by the purchase support performing module 1130, the game item providing module 1150 functions to provide the user with the game item corresponding to the purchase support target. It is described above that the purchase support performing module 130 performs a function of matching the identifier of the game item corresponding to the purchase support target with the identifier of the corresponding user to thereby store the identifier of the game identifier in the game progress database 1190 however, it is only an example. The above function may be performed by the game item providing module 1150.

As described above, when a purchase request for a particular game item is received via the user interface module 1110, the purchase support decision module 1120 may determine whether to support the purchase of the game item. Depending on system configuration, even without receiving a purchase request from the user, the purchase support decision module 1120 may determine whether to support the purchase of the game item with respect to particular users and thereby question a corresponding user about whether to transmit the purchase support request for the game item.

When the game is progressed by the game progress module 1180 and the user obtains game money according to the game progress, the purchase support management module 1160 may determine a reimbursement amount based on the reimbursement ratio of the purchase support amount included in the purchase support information. When the reimbursement amount is included in the purchase support information, the above reimbursement amount decision process may be omitted. The purchase support management module 1160 may subtract the determined reimbursement amount from the purchase support amount and thereby update the purchase support amount. Accordingly, the purchase support management module 1160 may provide the user with only the remaining residual game money after subtracting the determined reimbursement amount from the obtained game money of the user.

Specifically, when the user receiving the game item purchase support service obtains game money while the purchase support management module 1160 continuously monitors whether the user obtains game money, an amount may be automatically subtracted from the obtained game money of the user.

When the purchase support information associated with the corresponding user is updated due to the above reimbursement, the purchase support management module 1160 may update the purchase support information in the purchase support information database 1140. In this case, reimbursement information regarding a reimbursed date, a reimbursement amount, and the like may also be included in the purchase support information database 1140.

It is described above that the purchase support management module 1160 functions to determine, as the reimbursement amount of the purchase support amount, a portion of game money obtained by a corresponding user during the game process. Depending on system configuration, game money obtained by the user during the game progress and activity points of the user evaluated in the game may be periodically converted to game money. A portion of the converted game money may be determined as the reimbursement amount of the purchase support amount.

To accommodate this situation, the game item purchase supporting system 1000 may further include a game money conversion module 1170. The game money conversion module 1170 functions to periodically convert, to the game money, activity points of the user evaluated by the game progress module 1180. The converted game money may be stored in the game progress database 1190 in association with the identifier of the user.

The activity points may be determined based on at least one of, for example, a game play time, a game access frequency, a party play, and a chatting frequency with respect to the corresponding user.

The game progress module 1180 functions to progress or control a corresponding game according to a game logic of the game. The game progress module 1180 may evaluate the activity points of the user based on at least one of, for example, the game play time, the game access frequency, the party play, and the chatting frequency with respect to the user.

The game progress database 1190 may include information regarding, for example, items held by each user, a game play time of each user, a game access frequency of each user, a party play of each user, a chatting frequency of each user, activity points of each user, an amount of game money of each user, and the like in association with identification information associated with each user. In addition to the aforementioned information, various types of information associated with each user that may be used for the game progress may be included in the game progress database 1190 in association with an identifier of each corresponding user.

It is described above that the game item purchase supporting system 1000 may be included in the game server providing the game service online or may interoperate with the game server, however, this is only an example. Depending on system configuration, the game item purchase supporting system 1000 may be included in the game terminal providing the game service, for example, a terminal such as a console box. In this case, to process a corresponding game, a corresponding user may receive the game item purchase support service using an input module that is connected to the game terminal in a wired or wireless manner.

Hereinafter, a method of supporting a purchase of a game item according to an exemplary embodiment of the present invention will be described with reference to FIG. 2, FIG. 3, and FIG. 4.

Figure 2:
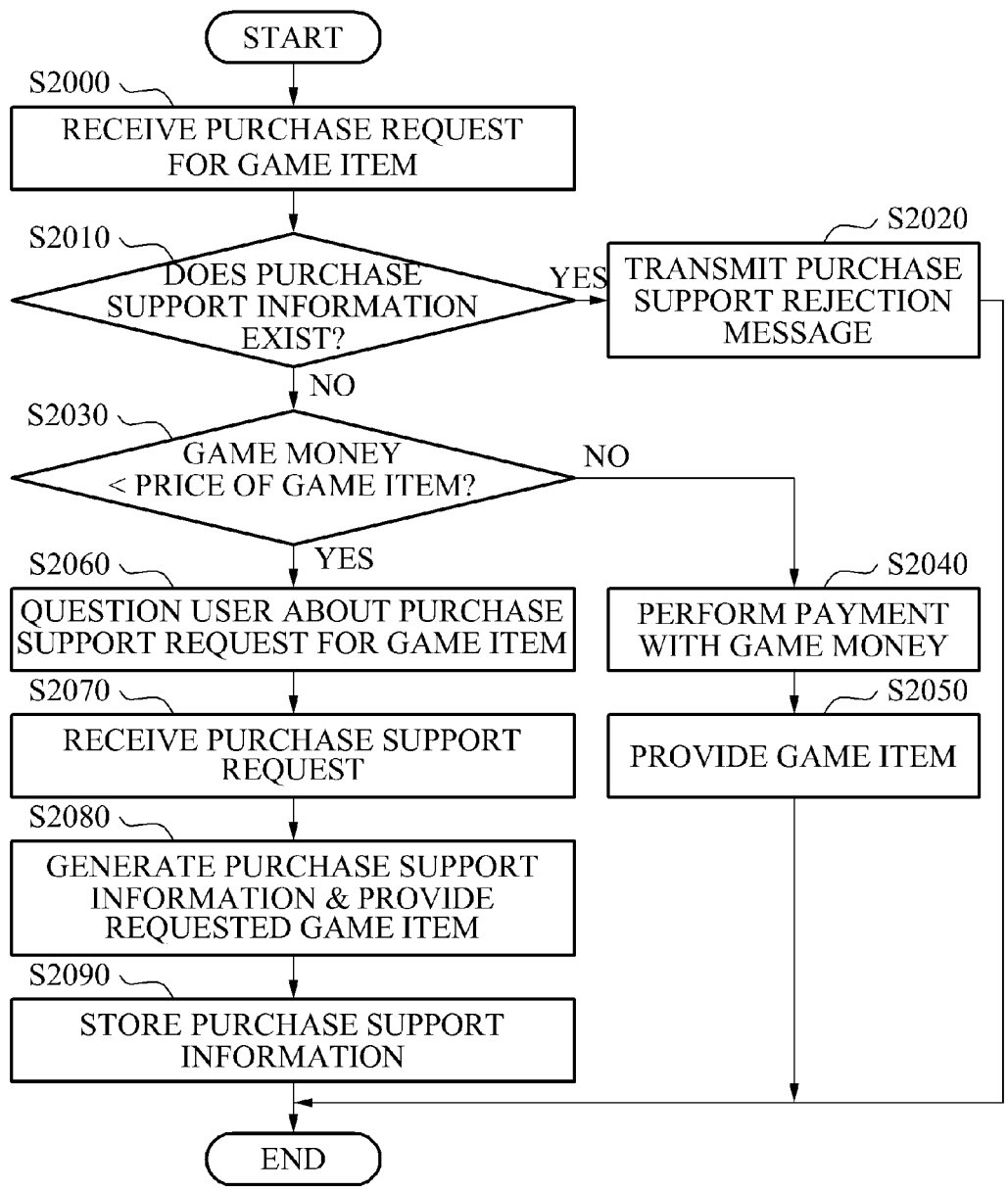
FIG. 2 is a flowchart illustrating a method of supporting a purchase of a game item according to an exemplary embodiment of the present invention.

FIG. 2 is a flowchart illustrating a method of supporting a purchase of a game item according to an exemplary embodiment of the present invention.

Referring to FIG. 2, when a purchase request for a particular game item is received from a user in operation S2000, whether the user is currently receiving a game item purchase support service, that is, whether purchase support information associated with the user exists may be determined in operation S2010. When the purchase support information is determined to exist, a purchase support rejection message with respect to the game item may be generated and transmitted to the user in operation S2020.

Alternatively, when purchase support information is determined to not exist, whether an amount of game money of the user is equal to or greater than a price of the requested game item may be determined in operation S2030. When the amount of game money of the user is equal to or greater than the price of the game item, a payment may be performed with the game money of the user in operation S2040, and the requested game item may be provided to the user in operation S2050.

Alternatively, when the amount of game money of the user is less than the price of the game item, questioning the user about whether to transmit a purchase support request for the game item may be performed in operation S2060. Operation S2060 may be performed by generating a purchase support request verification message and transmitting the purchase support request verification message to the user.

When the purchase support request for the game item is received from the user in operation S2070, the requested game item may be provided to the user and purchase support information associated with the user may be generated and be stored in operation S2080. The purchase support information may include a purchase support amount and a reimbursement ratio of the purchase support amount or a reimbursement amount.

In operation S2090, the generated purchase support information may be stored in association with an identifier of the corresponding user. To restrict a trade of the game item provided to the user using the purchase support service, the identifier of the game item may be stored in association with the identifier of the user. Accordingly, when the corresponding game item is used during the game process and a user identifier associated with the identifier of the game item changes, use of the game item may be suspended.

When the user desires to receive support for a portion of a price of the game item and to pay the remaining amount with game money of the user instead of receiving full support for an amount corresponding to the price of the game item, an operation of subtracting, from the amount of game money of the user, an amount of game money corresponding to an amount in which the determined purchase support amount is subtracted from the price of the game item may be additionally performed.

It is described above that, only when the user is not currently receiving the purchase support service and the game money of the user is less than the price of the game item may the purchase support service be provided, however, this is only an example. Depending on system configuration, regardless of whether the user currently receives the game item purchase support service, or regardless of the game money of the user, whether to support the purchase of the game item may be determined. Accordingly, operation S2010, operation S2020, operation S2030, operation S2040, and operation S2050 may be selectively included.

Also, it is described above that when the purchase request for the particular game item is received from a corresponding user, whether to support the purchase of the game item with respect to the user may be determined, however, this is only an example. Depending on system configuration, without receiving the purchase request for the game item from the user, it is possible to question the user about the purchase support request. Accordingly, operation S2000 may be selectively included.

Figure 3:
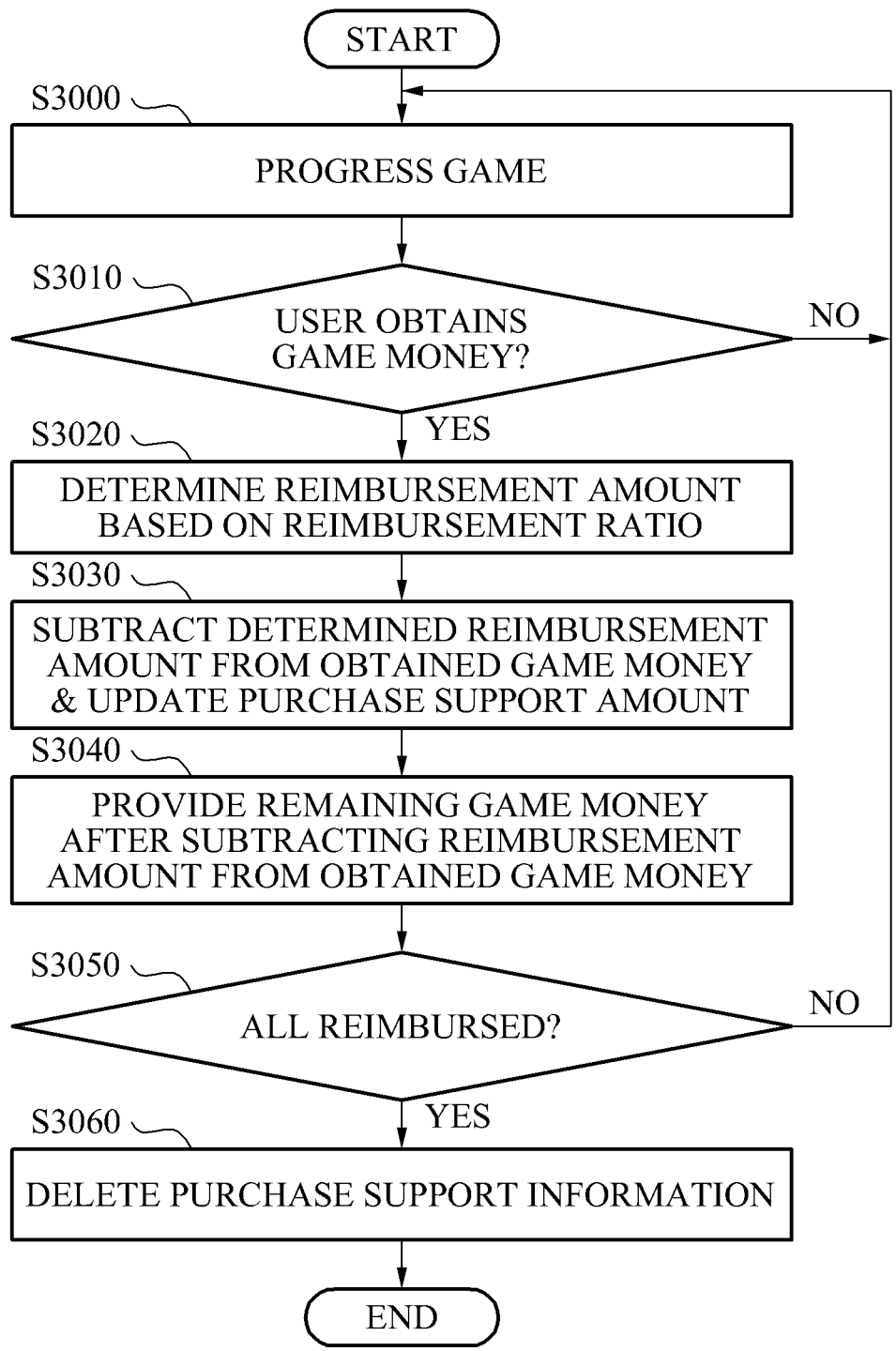
FIG. 3 is a flowchart illustrating a method of reimbursing a purchase support amount according to an exemplary embodiment of the present invention.

FIG. 3 is a flowchart illustrating a method of reimbursing a purchase support amount according to an exemplary embodiment of the present invention.

Referring to FIG. 3, when a game progresses in operation S3000, whether a user receiving a purchase support service obtains game money may be determined in operation S3010. When the user is determined to obtain the game money, a reimbursement amount may be determined based on a reimbursement ratio included in purchase support information associated with the user in operation S3020. Depending on system configuration, the reimbursement amount may be included in the purchase support information. In this case, operation S3020 may be omitted.

When the reimbursement amount is determined, the determined reimbursement amount may be subtracted from an amount of the obtained game money of the user and purchase support amount information included in the purchase support information may be updated based on information associated with the subtracted amount in operation S3030. In this case, updating of the purchase support amount information may be performed by updating a current purchase support amount included in the purchase support information to an amount in which the determined reimbursement amount is subtracted from the current purchase support amount.

In operation S3040, an amount of game money corresponding to the amount of obtained game money minus the determined reimbursement amount may be provided to the user.

In operation S3050, whether an entire amount of the purchase support amount included in the purchase support information is reimbursed may be determined. When the reimbursement is completed, the purchase support information associated with the user may be deleted in operation S3060.

Figure 4:
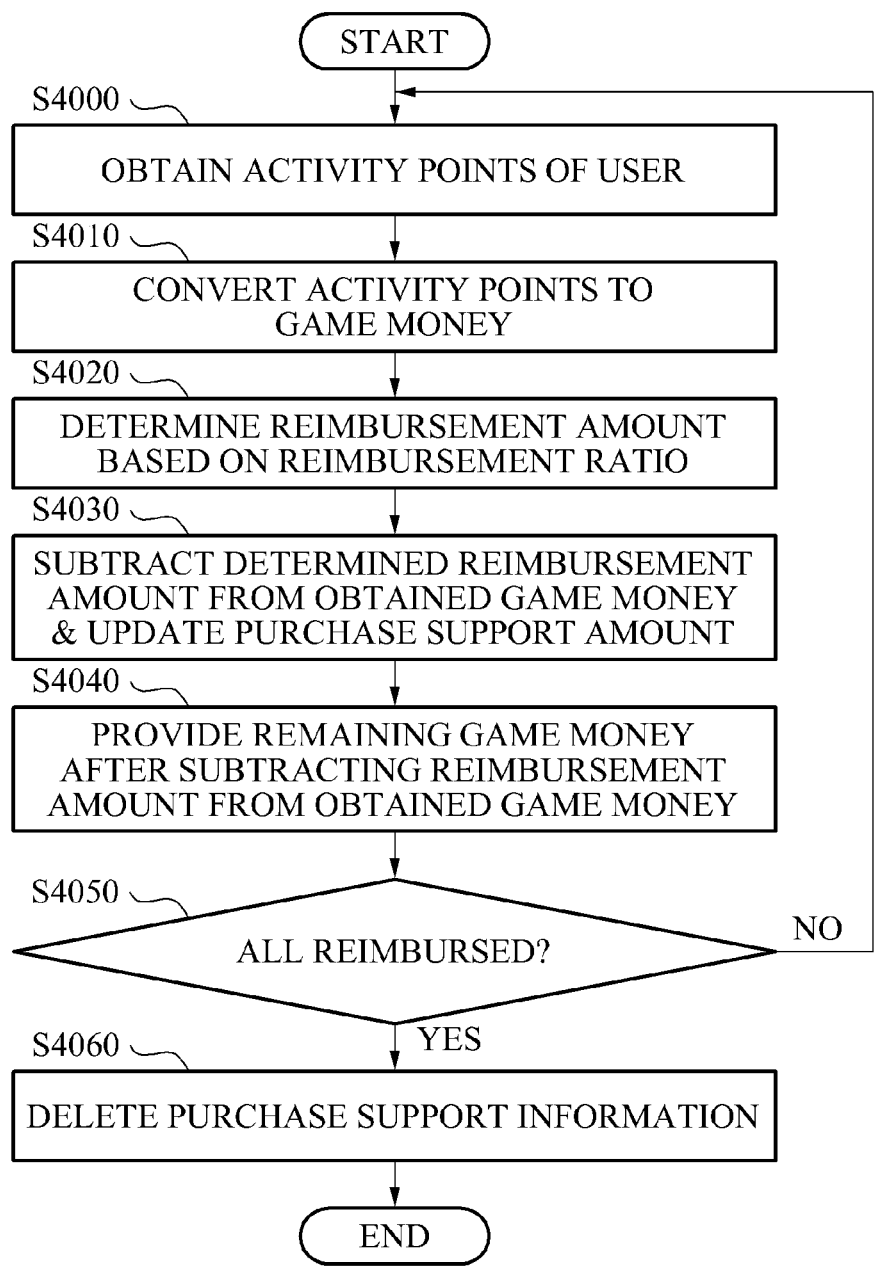
FIG. 4 is a flowchart illustrating a method of reimbursing a purchase support amount according to an exemplary embodiment of the present invention.

FIG. 4 is a flowchart illustrating a method of reimbursing a purchase support amount according to an exemplary embodiment of the present invention.

When activity points of a user evaluated during a game progress are obtained in operation S4000, the obtained activity points may be converted to game money using an algorithm in operation S4010. In operation S4020, a reimbursement amount may be determined based on a reimbursement ratio included in the purchase support information. As described above with reference to FIG. 3, the actual reimbursement amount may be included in the purchase support information. In this case, the above reimbursement amount decision process may be omitted.

Operation S4030, operation S4040, operation S4050, and operation S4060 will be the same as operations S3030, operation S3040, operation S3050, and operation S3060 of FIG. 3 and thus further description will be omitted here.

Accordingly, based on the exemplary embodiments of the present invention, even when a user does not have an amount of game money to cover a price of a game item, the user may obtain the game item. Therefore, the user's accessibility to a corresponding game is enhanced.

Also, based on the exemplary embodiments of the present invention, it is possible to convert, to an amount, game money obtained by a user during game progress or activity points of the user evaluated in a corresponding game. The user may reimburse a purchase support amount using the converted amount. Therefore, it is possible to enhance the user's interest in the game.

Also, according to exemplary embodiments of the present invention, it is possible to limit a trade of game items obtained through a purchase support, which is different from a game item obtained through a general method. Accordingly, it is possible to enable a stable game culture and to enhance an efficiency in a game progress.

The exemplary embodiments according to the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method using a processor to support a purchase of a game item, the method comprising:
   receiving a request for acquiring a game item, the request being associated with a purchase support request;
   determining, by the processor, whether purchase support information exist;
   generating, using the processor, the purchase support information if a price for acquiring the game item is greater than a game money;
   determining, by the processor, a reimbursement ratio and purchase supporting amount, the reimbursement ratio comprising ratio of an amount to be used for redeeming the purchase supporting amount;
   providing a purchase supporting money by subtracting an amount of the determined reimbursement ratio from the purchase supporting amount; and
   generating a rejection message of the purchase support information associated with providing the purchase supporting money in response to detection of the existence of the purchase supporting information.

2. The method of claim 1,
   wherein the determining a reimbursement ratio and purchase supporting amount based on an amount of the game money of the user and a price of the game item.

3. The method of claim 1, further comprising:
   generating the rejection message in response to a determination that purchase support information having been provided.

4. The method of claim 1, wherein the determining a reimbursement ratio and purchase supporting amount is performed associated with a game server configured to provide the user with a corresponding game online.

5. The method of claim 1, wherein the request for acquiring a game item is transmitted from a user terminal configured to provide the user with a corresponding game offline.

6. The method of claim 1, wherein the purchase support information comprises at least one of the purchase support amount, the reimbursement ratio, or a reimbursement amount.

7. The method of claim 1, further comprising:
   removing an amount of game money based on the determined reimbursement ratio from the first amount of game money obtained by a user; and
   updating a purchase support amount of the purchase support information from a second amount to a third amount, the third amount being equal to the second amount minus determined reimbursement amount.

8. The method of claim 1, further comprising:
   converting at least one activity point associated with identification information of the user corresponding to a game;
   determining a reimbursement amount based on the reimbursement ratio of the purchase support information;

updating the purchase support amount from a second amount to a third amount, the third amount being equal to the second amount minus reimbursement amount determined by the redeem ratio; and providing the game money in an amount equal to the first amount of game money minus the determined reimbursement amount.

9. The method of claim 8, wherein the at least one activity point is determined based on at least one of a game play time, a game access frequency, a party play, or a chatting frequency with respect to the user.

10. The method of claim 1, further comprising:

storing an identifier of the game item provided to the user in association with identification information of the user, and suspending use of the game item in response to detection of a change of the identification information of the user associated with the identifier of the game item.

11. The method of claim 1, further comprising:

deleting the purchase support information associated with the identification information of a user in response to detection of reimbursement of an entire purchase support amount of the purchase support information.

12. The method of claim 1, further comprising:

removing an amount of game money from an amount of game money corresponding to an identification of a user.

13. A non-transitory computer-readable medium comprising an executable program which, when executed, performs the method:

receiving a purchase support request for a game item, the purchase support request transmitted from a user terminal;

determining whether purchase support information exist;

generating the purchase support information if a price for acquiring the game item is greater than a game money;

generating an identifier of the game item corresponding to identification information of the user terminal, wherein the purchase support information in association with identification information of the user is stored in a storage device;

providing a purchase support information based on the game money and activity points by subtracting reimbursement amount from a purchase supporting amount; and generating a rejection message of the purchase support information in response to detection of the existence of the purchase supporting information.

14. A system for supporting a purchase of a game item, the system comprising:

one or more modules being configured and executed by one or more processors, the one or more modules comprising a user interface module configured to receive a purchase request or a purchase support request for a game item;

a purchase support decision module configured to determine, by the one or more processors, whether purchase support information exist, the purchase support information being associated with purchasing the game item with respect to a user by converting game money and activity points obtained during a game into an amount associated with supporting the purchase of the game item;

a purchase support performing module configured to generate the purchase support information if a price for acquiring the game item is greater than a game money; and a game item providing module configured to provide the user with a purchase support information based on the determined game money and activity points, and to provide a rejection message of the purchase support information in response to detection of the existence of the purchase supporting information.

15. The system of claim 14, wherein the purchase support information comprises at least one of a purchase support amount, a reimbursement ratio, or a reimbursement amount.

16. The system of claim 14, further comprising:

a purchase support management module configured to determine a reimbursement amount based on a reimbursement ratio of the purchase support information, in response to determination of an amount of game money by the user, to remove an amount of game money equal to the determined reimbursement amount from the amount of game money, and to update a purchase support amount of the purchase support information from a first amount to a second amount equal to the first amount minus the determined reimbursement amount.

17. The system of claim 14, further comprising:

a game money converting module configured to convert, to a first amount of game money, at least one activity point associated with the user in a corresponding game; and a purchase support management module configured to determine a reimbursement amount based on a reimbursement ratio of the purchase support information, to update a purchase support amount of the purchase support information from a second amount to a third amount, the third amount being equal to the second amount minus the determined reimbursement amount, and to provide the user with game money in an amount equal to the first amount of game money minus the determined reimbursement amount.

18. The system of claim 17, wherein the at least one activity point is determined based on at least one of a game play time, a game access frequency, a party play, or a chatting frequency with respect to the user.

19. The system of claim 14, wherein the purchase support performing module is configured to store an identifier of the game item provided to the user in association with an identifier of the user, to monitor whether the identifier of the user associated with the identifier of the game item changes during a game progress, and to suspend use of the game item in response to a change of the identifier of the user associated with the identifier of the game item.

20. The system of claim 14, wherein the purchase support performing module is configured to delete the purchase support information associated with the user in response to reimbursement of an entire purchase support amount of the purchase support information.

21. A method that uses a processor to support purchase of a game item, the method comprising:

receiving a request for acquiring a game item, the request being associated with purchase support information;

determining, by the processor, whether the purchase support information being provided;

transmitting a message rejecting of providing the purchase support information if the purchase support information being provided;

determining, by the processor, whether game money is greater than a price of the game item if the purchase support information not being provided; and providing the purchase support information for acquiring the game item if the game money is determined less than the price of the game item and the purchase support information not being provided.

\* \* \* \* \*